April 19, 1955 W. P. MASON 2,706,326
POLARIZATION PROCESS FOR PSEUDOCUBIC FERROELECTRICS
Filed April 23, 1952

INVENTOR
W. P. MASON
BY N. S. Ewing
ATTORNEY

United States Patent Office 2,706,326
Patented Apr. 19, 1955

2,706,326

POLARIZATION PROCESS FOR PSEUDOCUBIC FERROELECTRICS

Warren P. Mason, West Orange, N. J., assignor to Bell Telephone Laboratories, Incorporated, New York, N. Y., a corporation of New York Application April 23, 1952, Serial No. 283,913

1 Claim. (Cl. 29—25.35)

This invention relates to electromechanical transducers comprising ferroelectric elements and, more particularly, although not exclusively, to a polarization process for enhancing the properties of a ferroelectric element composed of potassium niobate.

Certain ferroelectric materials of which barium titanate is a notable example are known to possess electrostrictive and piezoelectric properties in such a degree as to adapt them for use in microphones, telephone receivers, phonograph pickups, electrostrictive relays, and other electromechanical transducers. The material is commonly incorporated in a ceramic, or otherwise arranged to form a solid polycrystalline aggregate, which is then cut to form a disc, strip, or like element. The latter is provided with a mechanical mounting suitable for a prescribed mode of mechanical vibration and also with electrodes placed conformably with the vibrational mode.

The electrical-mechanical conversion is enhanced if the element is polarized, that is to say, if the electrically polarized ferroelectric domains within the material have preponderantly a certain orientation relative to the vibrational pattern and the electrodes; and the degree of conversion (or the electromechanical coupling coefficient) depends on the degree of polarization or extent to which the domains have the same specified orientation. Techniques have been developed heretofore for polarizing ferroelectric elements so that some of the domains are caused to assume and retain the desired orientation. In accordance with one of these so-called prepolarizing techniques the ferroelectric element is subjected to an intense electric field for a protracted period. In accordance with another and favored technique the element is heated to a temperature above its Curie temperature (120° C. in the case of barium titanate), a polarizing electric field is applied to the electrodes, and the field is maintained while the element cools.

The foregoing prepolarizing techniques have been applied successfully to barium titanate elements and they can be and have been applied to elements composed of potassium niobate such as those disclosed in the copending application of B. T. Matthias, Serial No. 86,176, filed April 8, 1949, which matured into United States Patent 2,597,589, granted May 10, 1952. The results obtained with these techniques in the case of potassium niobate, however, are almost negligibly small in comparison with the results obtained with the present invention. The first of the mentioned techniques resulted in a coupling coefficient that was comparatively small, and such polarization as was achieved would be completely removed if in subsequent use the element should be subjected to a reverse field of as little as 2000 volts per centimeter. The second technique proved equally unsatisfactory.

One of the objects of the present invention is to increase the polarization of a potassium niobate element and to increase the resistance of the element to depolarization. Another object is to provide an improved potassium niobate transducer element.

I have discovered that the prepolarization of a potassium niobate element can be improved radically by a process that involves application to the element of a polarizing field of critical magnitude and concurrent variation of the temperature of the element over a narrow range far below the Curie temperature. More specifically, I have found that optimum prepolarization of such an element can be obtained by heating the element to a temperature of 210° C. or slightly more and allowing it to cool while maintaining in the element a constant polarizing field of about 9000 volts per centimeter. With this technique approximately 50 per cent of the ferroelectric domains have been aligned in the direction of the field, and a coupling coefficient of 55 per cent has been obtained in a potassium niobate element adapted for vibration in the thickness longitudinal mode, and a coupling coefficient of 30.6 per cent for the radial mode of vibration, which compares favorably with the corresponding values of 50 and 28 for barium titanate. Potassium niobate ceramic so polarized has been found capable of withstanding 10,000 volts per centimeter without depolarizing.

As a result of the high coupling coefficients that can now be achieved and the relatively low dielectric constant of the material, potassium niobate transducer elements will produce an open circuit voltage for a given mechanical stress that is 3.5 times as high as that produced by ceramic barium titanate. Furthermore, the elements have a low mechanical Q (of about 10) which is attributable to the low electrical Q of the material and which is advantageous in phonograph pickups, relays and microphones, for specific example, where the low Q serves to damp out unwanted resonances.

The above-mentioned temperatures and polarizing field strength are critical. I found, for example, that if the polarizing field were applied to the element with the latter at a temperature of 220° C. the maximum field that could be employed without permanently damaging the element was about 5000 volts per centimeter and the resulting coupling coefficient, for the radial mode, was only 18 per cent. Again, at 195° C. a polarizing field of 14,000 volts per centimeter could be obtained but the resulting coupling coefficient was only 17.9 per cent. The maximum effect is to be attained, as indicated, with a polarizing field of about 9000 volts per centimeter applied to the element when the temperature of the latter is at least 210° C. but not more than about 215° C. The polarizing field is maintained until the element has cooled to at least a few degrees below 210° C. and it may be maintained until the element has cooled to room temperature.

I attribute the effects described to a happy combination of circumstances in which the following are significant factors. Potassium niobate appears in one crystalline form or another depending on its temperature. Above the Curie temperature (430° C.) the crystalline form is cubic and the material is not ferroelectric. The tetragonal form prevails from the Curie temperature down to 210° C. where the orthorhombic form appears, and at a still lower temperature the crystalline structure becomes trigonal. At the various transition temperatures the crystalline structure is in an unstable state and the forces restraining alignment of the domains in any one direction are relatively small and so also are the coercive fields that are characteristic of the material at the respective transition temperatures. In addition, the 9000 volts per centimeter applied field is substantially equal to or slightly greater than the coercive field at the first sub-Curie transition temperature, i. e., 210° C. Another significant factor is that whereas the "breakdown" field strength that causes permanent impairment of the element decreases with an increase in temperature of the element, it is at least somewhat greater than the coercive field at temperatures ranging downward from 215° C. Thus over a very limited temperature range extending upwards only a few degrees from the first sub-Curie transition temperature the breakdown field exceeds the coercive field, and a polarizing field is therefore possible that exceeds the one but not the other.

Consistent with the foregoing, the invention is applicable in principle to other ferroelectric materials, to sub-Curie transition temperatures other than the first, and to a reversed heating-and-cooling cycle. In the example described it will be observed, of course, that the polarization is effected at the first sub-Curie transition temperature and that the element passes through no other transition temperature in cooling to room temperature, which is the temperature at which the device presumably will operate. Other ferroelectric materials exhibit a second sub-Curie transition temperature above room temperature and the polarization may be carried out at that temperature if desired. However, in such a case even if the uppermost of these two transition temperatures is employed, it will be observed that the polarizing field can be safely maintained on the element as it cools down through the lower transition temperature.

Considering now the case of a transition temperature below room temperature, one could refrigerate the element to a temperature below that transition temperature, apply a polarizing field that is at least equal to the coercive field at that transition temperature, maintain the polarizing field while heating the element to or slightly beyond the transition temperature, and then remove the polarizing field so as to avoid the breakdown that would otherwise occur with further increase in the temperature of the element.

Further details regarding the invention will appear in the following treatment of a specific embodiment, reference being made to the accompanying drawings in which.

Figure 1:
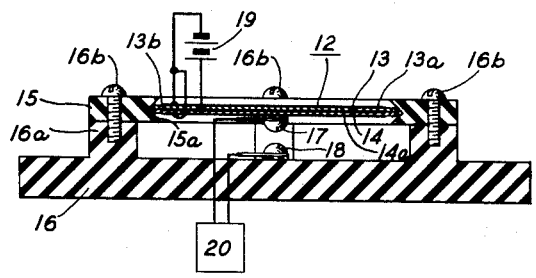
Fig. 1 is an elevational cross section of a high speed electrostrictive relay having polarized plates of potassium niobate.
Figure 2:
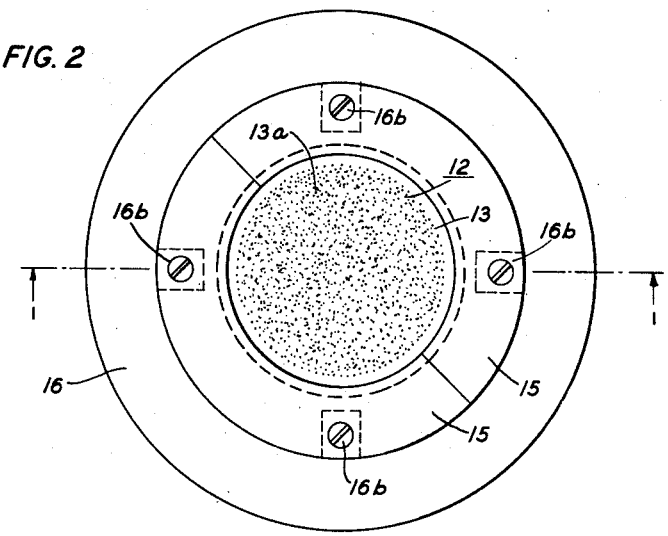
Fig. 2 illustrates a top plane view of the high speed electrostrictive relay shown in cross section in Fig. 1.
Figure 3:
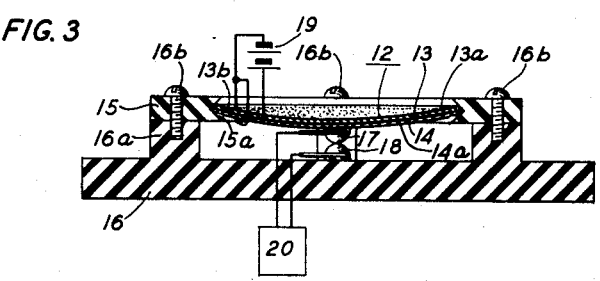
Fig. 3 is an elevational cross section of the high speed electrostrictive relay of Fig. 1 where the relay points are closed.

In the drawing of Fig. 1 a bimorph ceramic disc 12, comprised of circular plates 13 and 14 of potassium niobate ceramic, is mounted at its edge in a V-shaped recess 15a in the circular wall of the drilled plate 15 made of rigid insulating material such as wood or plastic. The bimorph disc is freely mounted in the recess plate 15 so that it may have a center flexure motion. Plate 15 is split into two separable halves across its diameter to facilitate mounting of the bimorph disc, and is connected by screws 16b to equally spaced legs 16a which are a part of the base plate 16 and are made of rigid insulating material. Electrical contacts 17 and 18 having insulated mounting portions are connected, one to the center of one face of the bimorph disc 12 and the other to the base plate 16, so that a center flexing motion of the disc will cause the contacts to close.

Each of ceramic discs 13 and 14, comprising the bimorph disc 12, is a potassium niobate element 1.27 centimeters in diameter, 0.092 centimeter thick, having a density of 4.19 grams per cubic centimeter. The discs are individually polarized in the thickness mode by placing them in a silicone oil bath and raising their temperatures to slightly above the first sub-Curie transition temperature of 210° C. or to about 215° C. At this temperature an electric field is applied which is at least equal to the coercive field and less than the breakdown field at that temperature, or in this case about 9000 volts per centimeter, and said field is maintained while the elements are cooled to a temperature below the said transition temperature or to about 205° C. or lower.

As previously suggested this process of orienting the domains effectively changes the pure square-law electrostrictive properties of the disc so that when placed in proper alignment in an electric field its radius will grow and shrink in response to positive and negative fields. Discs that have been so treated and measured for degree of conversion are found to have the high coupling coefficient of 30.6 per cent and a resonant frequency of 240,000 cycles per second in the radial mode, and a coupling coefficient of 55.5 per cent and a resonant frequency of 2,700,000 cycles per second in the thickness-longitudinal mode.

To permit application of an electric field to the polarized bimorph disc 12, flexible, conductive electrodes are affixed to its planar surfaces, a common electrode 13b being centered between discs 13 and 14 which are in turn cemented together so that the joined faces of the two discs are of opposite polarity with disc 13 being poled towards the jointure. Electrodes 13a and 14a are affixed respectively to the exposed faces of discs 13 and 14 of the bimorph disc 12.

One conductor of an electric source 19 is connected to the common electrode 13b, and its other conductor is connected to the outer electrodes 13a and 14a so that electric fields are set up which cause center flexure motion in the bimorph. The field in disc 13 supports the poling of that disc and tends to cause the disc to decrease in diameter, while the opposing field in disc 14 tends to cause the said disc to increase in diameter. The resultant motion is a flexure at the center of the bimorph disc 12 that causes contacts 17 and 18 to meet and close the electric circuit 20.

While a flexure motion can be achieved without applying a field to disc 14, an appreciably greater center displacement results when the opposing or "negative" field is applied to the disc and the disc is made to actively aid the flexure motion. Under such conditions a polarized element that is highly resistive to depolarizing fields greatly enhances the utility of the element and in this instance a potassium niobate element polarized according to the above method has been found to be capable of withstanding a field of 10,000 volts per centimeter at room temperature without depolarizing.

A low mechanical Q that gives potassium niobate good mechanical properties, and also its ability to withstand temperatures up to 200° C. without suffering any appreciable change in properties, makes potassium niobate especially useful and stable as a relay component, for example. The further application of the prepolarizing process disclosed herein to a potassium niobate element not only increases the polarization of the element and the resistance of the element to depolarization compared to values that have been obtainable heretofore but it also produces a transducer element having enhanced electrostrictive properties that endow the element with greatly improved piezoelectric characteristics.

What is claimed is:

A method of permanently polarizing an electromechanical transducer element of potassium niobate, which comprises heating said element to a transition temperature within the range 210 to 215 degrees centigrade, applying to said element a unidirectional electric field of substantially 9000 volts per centimeter, and maintaining said element in said field while the temperature of said element is lowered substantially below said range of temperatures.

References Cited in the file of this patent

UNITED STATES PATENTS

| | | |
|---|---|---|
| 2,486,560 | Gray | Nov. 1, 1949 |
| 2,584,324 | Bousky | Feb. 5, 1952 |
| 2,597,589 | Matthias | May 20, 1952 |
| 2,598,707 | Matthias | June 3, 1952 |

OTHER REFERENCES

J. Am. Chem. Soc., v. 30, No. 11, November 1908, pages 1648–1652 pertinent. Copy in Scientific Library.